United States Patent [19]

Hasson et al.

[11] 4,335,462
[45] Jun. 15, 1982

[54] APPARATUS AND METHOD FOR GENERATING A GLOW DISCHARGE

[75] Inventors: Victor H. Hasson; Hubertus M. Von Bergmann, both of Pretoria, South Africa

[73] Assignee: The South African Inventions Development Corporation, Pretoria, South Africa

[21] Appl. No.: 207,095

[22] Filed: Nov. 14, 1980

Related U.S. Application Data

[63] Continuation of Ser. No. 958,858, Nov. 8, 1978, abandoned.

[30] Foreign Application Priority Data

Nov. 25, 1977 [ZA] South Africa ............... 77/7022
Feb. 5, 1978 [ZA] South Africa ............... 78/0669

[51] Int. Cl.³ ............................................. H01S 3/097
[52] U.S. Cl. ........................................ 372/85; 313/198; 372/86; 372/87
[58] Field of Search ............ 331/94.5 G, 94.5 PE, 331/94.5 D; 313/184, 198; 315/335

[56] References Cited

U.S. PATENT DOCUMENTS

| 3,935,547 | 1/1976 | Riemersma et al. | 331/94.5 PE |
| 3,992,643 | 11/1976 | Vital et al. | 313/198 |
| 4,065,370 | 12/1977 | Noble et al. | 313/198 X |
| 4,085,386 | 4/1978 | Farish et al. | 331/94.5 PE |
| 4,088,965 | 5/1978 | Lauderslager et al. | 331/94.5 PE X |
| 4,135,167 | 1/1979 | Godard | 331/94.5 PE |

OTHER PUBLICATIONS

Hasson et al., "Effective Glow Discharge Excitation of Nitrogen Lasers at Gas Pressures Ranging from 0 to 5 Bar", APL., vol. 28, No. 1, Jan. 1976, pp. 17-18.

Primary Examiner—James W. Davie
Attorney, Agent, or Firm—Ladas & Parry

[57] ABSTRACT

This invention provides a laser or high voltage switch which has two spaced apart main discharge electrodes which define between them a main discharge gap, a discharge inducing member that is of an insulating material and which provides a planar or curved trigger discharge surface adjacent the electrodes and partially or completely bridging the main discharge gap, and an auxiliary conductor on the other side of the discharge inducing member to the main discharge electrodes and capacitively coupled to one of them by a distributed stray capacitance, such that when an excitation pulse is applied across the main discharge electrodes an initial capacitively initiated low order trigger discharge occurs onto the trigger discharge surface, and preferably across the surface from one main discharge electrode to the other. This trigger discharge photo-ionises a gas in the main discharge gap to cause a glow discharge between the main electrodes. The auxiliary conductor may be sheet like and may be either part of a pulsing circuit or it may be directly electrically coupled to one of the main discharge electrodes. The conductor may be shielded by a shielding member to vary the capacitive coupling between the conductor and the main discharge electrode. One or both of the main discharge electrodes may have a curved portion and a sharpened portion to induce a corona discharge.

38 Claims, 5 Drawing Figures

APPARATUS AND METHOD FOR GENERATING A GLOW DISCHARGE

This is a continuation of application Ser. No. 958,858 filed Nov. 8, 1978, now abandoned.

FIELD OF THE INVENTION

This invention relates to an apparatus and a method for generating a transversely excited glow discharge in a gas. The apparatus may particularly be a laser or a high voltage switch.

DESCRIPTION OF PRIOR ART

The applicant is aware of a number of ways in which pulsed high pressure gas discharge lasers and high voltage switches can be stabilized using electron seeding procedures. Many of these rely on volume photoionization by photons in the ultraviolet frequency range, the photons being generated by neighbouring auxiliary discharges. Such a system is described in a paper by H. M. Lamberton and B. R. Pearson in Electronic Letters, 7, 141(1971). However, with such systems, energy limiting devices (and possibly delay circuits) are used to control the trigger and main discharges and their relative timing. These techniques were developed primarily for devices with main electrode separations of 1 to 10 cm and plasma volumes of 0.1 to 1.0 liter. They are relatively cumbersome and cannot be scaled down to millimeter dimensions.

These shortcomings were to a certain extent overcome by the invention described in our U.S. Pat. No. 4,114,113, which utilizes a high impedance corona discharge to condition the gas for a stabilized, distributed glow discharge, which causes lasing action in the gas. A similar technique applied to switches forms the subject matter of our U.S. Pat. No. 4,035,683.

It is an object of the invention to provide a technique whereby the trigger discharge may be more easily and effectively initiated and controlled, and whereby lasers and switches may be miniaturized.

SUMMARY OF THE INVENTION

According to the invention there is provided an apparatus for generating a transversely excited glow discharge in a gas, including
  two spaced-apart main discharge electrodes which define between them a main discharge gap;
  means for immersing the main discharge electrodes in a gas;
  a discharge inducing member that is of an insulating material and which provides a trigger discharge surface adjacent the electrodes and bridging the main discharge gap; and
  an auxiliary conductor located on the other side of the discharge inducing member to the main discharge electrodes and capacitively coupled to a first one of the main discharge electrodes such that when an excitation pulse is applied across the main discharge electrodes an initial capacitively initiated low order trigger discharge occurs onto the trigger discharge surface which photoionises the gas in the main discharge gap to cause a glow discharge between the main electrodes.

The main discharge electrodes, the discharge inducing member and the auxiliary conductor may be suitably configured such that the trigger discharge tracks across the trigger discharge surface. They may also be suitably configured such that the dynamic impedance of the trigger discharge is greater than that of the main glow discharge.

Ideally, the auxiliary conductor is capacitively coupled to the said first one of the main discharge electrodes by distributed stray capacitance.

In order to enhance the capacitive coupling between the said first main discharge electrode and the conductor, the discharge inducing member may have a suitable dielectric coefficient. The discharge inducing member may thus be of glass, which has a dielectric coefficient of 5 to 10; a synthetic plastics material such as bakelite having a dielectric coefficient in the range of 5 to 18; strontium titanate having a dielectric coefficient of the order of 300; or any other suitable material. It has been found that the member may advantageously be of a ceramic material. Further in regard to the discharge inducing member, its trigger discharge surface may be curved or planar. The trigger discharge surface may bridge the discharge gap partially or totally. The main discharge electrodes may also be in contact with the surface.

It will be appreciated that the auxiliary conductor may be connected in a circuit or it may be floating. The conductor may also have an insulating coating, or it may not. In one particular embodiment the auxiliary conductor may be a sheet-like return conductor. In another embodiment, the auxiliary conductor may be directly electrically connected to the second main discharge electrode.

In order to ensure a glow discharge the main discharge electrodes may be rounded to provide a uniform field. However, in order to obtain a suitable trigger discharge the said first main discharge electrode may have a rounded main discharge portion and a sharpened trigger discharge portion. Similarly, the second main discharge electrode may also have a rounded main discharge portion and a sharpened trigger discharge portion, the trigger discharge then taking place between the trigger discharge portions of the two main discharge electrodes. However, it will be appreciated that the main discharge electrodes need not both have discrete trigger discharge portions. Both main discharge electrodes may have portions that are not well defined, between which the trigger discharge occurs. These portions are determined by the profiles and geometry of the electrodes and the character or quality of their surfaces and of dielectric surfaces with which they are in contact.

The apparatus may also include a shielding member for electrically shielding the said first main discharge electrode from the auxiliary conductor.

It will be understood by those skilled in the art, that the amount of capacitive coupling between the said first main electrode and the conductor may be varied in a number of ways: by varying the shapes of the electrodes; by varying the configuration of the trigger discharge surface; by varying the distance between the electrodes and the conductor; by shielding the conductor; by varying the distance between the electrode and the conductor and by varying the dielectric constant or the thickness of the discharge inducing member. The trigger discharge surface may also be suitably profiled to control the effective length of the trigger discharge and accordingly its impedance.

The means for immersing the main discharge electrodes in a gas may comprise a housing. A portion of the housing may comprise the discharge inducing member.

The housing may also have at least one port through which the gas may be introduced into the housing. If gas is to be flushed through the housing may have an inlet and an outlet port through which the gas may be passed through the housing.

The apparatus may be operated at any suitable gas pressure. More particularly the gas may be at a pressure of 10 KPa to 150 KPa, although it may be as high as 2 MPa.

A pulse generating means for supplying a voltage pulse across the main discharge electrodes may also be provided, which may be of the Blumlein-transmission type.

In a particular application, the apparatus may be a laser, the gas being lasing gas. In an alternative particular application, the apparatus may be a high voltage switch, the gas then being a suitable insulating gas. Thus, the gas may be of any suitable type, eg nitrogen, carbon dioxide, a rare gas or the like. Mixtures of gases may also be utilised.

The electrodes themselves may be of any suitable material, eg a Ni-Cr-Fe alloy, aluminium, gold, copper, stainless steel, carbon, nickel, etc.

Further according to the invention, there is provided a method of generating a transversely excited glow discharge in a gas between two spaced-apart main dischage electrodes which define between them a discharge gap, including applying an excitation pulse across the main discharge electrodes;

discharging a capacitively initiated low order trigger discharge onto a trigger discharge surface provided by a discharge inducing member that is of an insulating material and which is adjacent the main discharge electrodes and which bridges the discharge gap; and photo-ionising the gas in the discharge gap by means of the trigger discharge to cause a glow discharge between the main discharge electrodes.

The trigger discharge may track across the trigger discharge surface, and may have a greater dynamic impedance than that of the main glow discharge. More particularly the trigger discharge may be initiated due to distributed stray capacitance. As indicated earlier, the trigger discharge surface may bridge the discharge gap totally or partially.

In one form the trigger discharge may occur between a portion of a first one of the main discharge electrodes and the trigger discharge surface, and may track across the trigger discharge surface onto a portion of a second one of the main discharge electrodes. Further, the trigger discharge may occur from a sharpened portion of the said first main discharge electrode, and may terminate on a sharpened portion of the said second main discharge electrode. The trigger discharge may accordingly be initiated by capacitive coupling between the said first main discharge electrode and an auxiliary conductor located on the opposite side of the discharge inducing member to the main discharge electrodes. This capacitive coupling may be varied to be a suitable value by means of a shielding member.

As regards the main discharge, it may occur between rounded portions of the main discharge electrodes. This main glow discharge may cause the gas to lase.

The gas may be passed between the main discharge electrodes and may be at a pressure of at least 10 KPa.

The invention still further extends to a method of switching a current at high voltage between two spaced-apart discharge electrodes, which includes generating a glow discharge between main discharge electrodes in accordance with the method stated above.

DESCRIPTION OF PREFERRED EMBODIMENTS

The invention is now described, by way of examples, with reference to the accompanying drawings, in which.

Figure 1:
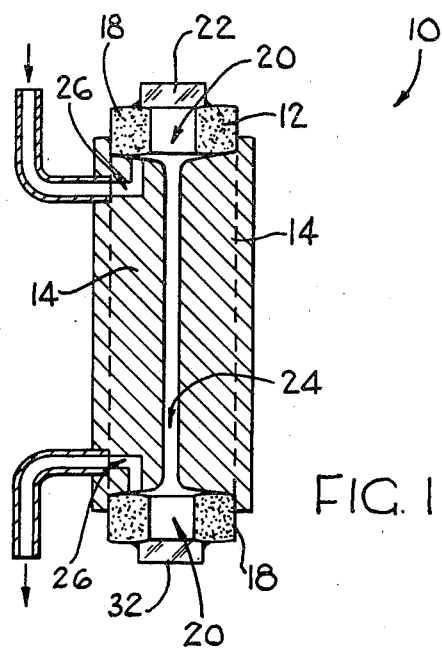
FIG. 1 shows a longitudinal sectional view of a laser in accordance with the invention.
Figure 2:
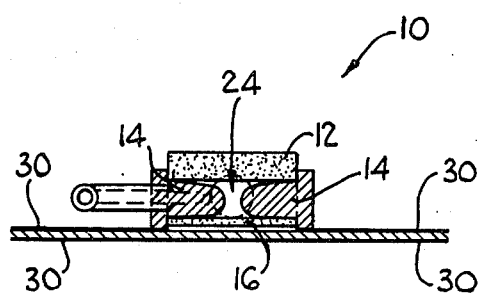
FIG. 2 shows a transverse sectional view of the laser as well as part of its Blumlein excitation system.

Referring to FIGS. 1 and 2, the laser is designated generally by reference numeral 10. The laser 10 comprises a rectangular ceramic housing 12, having slots in its sides in which two Ni-Cr-Fe electrodes 14 are sealed. As shown in FIG. 2, the electrodes 14 are elongate and rounded and are substantially 'T'-shaped with one of the arms of the 'T' extending below the lower side wall 16. The end walls 18 of the housing 12 have circular apertures 20 closed off with laser mirrors 22,32. The electrodes 14 are spaced-apart to define a discharge gap 24. The electrodes 14 are 50 mm long with a semi-circular profile having a radius of 2.5 mm. The electrodes 14 are separated by 2.25 mm. Outside dimensions of the laser 10 are 70 mm×25 mm×12 mm.

One of the electrodes 14 has a passage 26 at either end, through which the interior of the housing 12 may be evacuated and then filled and sealed with a suitable gas, such as nitrogen, at atmospheric pressure.

In use, the laser 10 is placed on a D.C. chargeable Blumlein excitation system formed from a flexible polyester based circuit board having a copper conductive layer 30 on both sides. On one side a strip of the copper layer 30 is etched away and the laser 10 placed thereon so that one of the electrodes 14 is in electrical contact with one piece of copper and the other electrode 14 with the other piece of copper. A fast, air-pressurized, free-running spark-gap (not shown) providing reliable operation at voltages of up to 20 KV and switching times of 2.5 ns is used to pulse the laser 10. The total storage capacitance of the Blumlein system is 1 nF, and it has a characteristic impedance of 1.4 ohms.

In operation, when the laser 10 is pulsed, due to the capacitive coupling between one of the electrodes 14 and the bottom copper return conductor 30 and between the electrodes 14, an initial distributed trigger discharge occurs between the two electrodes 14 across the inner surface of the side wall 16. This trigger discharge is a low order, low energy distributed surface discharge which photo-ionizes the nitrogen gas in the discharge gap 24 to a large degree and over a substantial volume, conditioning the gas so that a distributed lasing glow discharge occurs between the electrodes 14. As the impedance of the surface discharge is greater than that of the lasing glow discharge, most of the energy is channeled into the lasing glow discharge, the surface discharge decreasing in intensity or terminating.

With this laser 10, peak output powers of about 150 Kw have been obtained, at a pressure of about 80 KPa and a charging voltage of 18 KV. The laser 10 has also been operated at a repetition rate of 30 Hz, with over $10^8$ shots, without any visible damage to the electrodes or deterioration of operation.

Figure 3:
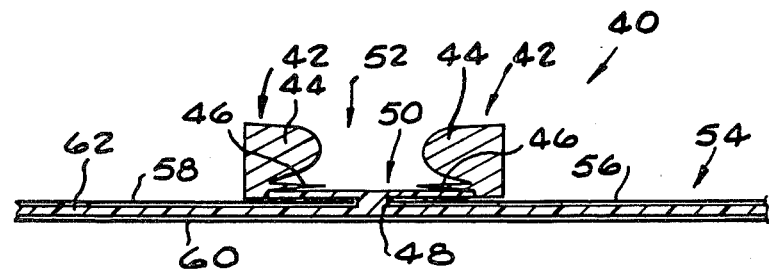
FIG. 3 shows a transverse sectional view of a switch in accordance with the invention.

Referring now to FIG. 3, a free-running switch, designated generally by reference numeral 40, is shown. This switch 40 has two composite electrodes 42, each having a rounded portion 44 and a sharpened trigger portion 46. The trigger portions 46 rest on a sheet 48 of a suitable insulating synthetic plastics material, the upper surface 50 of which bridges the gap 52 between the electrodes 42. The electrodes 42 and the sheet 48 rest on the upper surface of a Blumlein transmission system 54 having two copper supply conductors 56 and 58 spaced from a return conductor 60 by a polyester circuit board 62. The electrodes 42 are each in intimate electrical contact with one of the supply conductors 56 and 58. The two conductors 56 and 58 are spaced-apart, the strip between them also being filled by the insulator 48 to inhibit breakthrough. It will be appreciated that the electrodes 42 are capacitively coupled, as are the electrodes 42 and the return conductor 60. However, as the electrodes 42 are shielded from the return conductor 60 by the conductors 56 and 58, the amount of stray capacitive coupling between the electrodes 42 and the return conductor 60 is determined by the separation of the conductors 56 and 58—the greater the separation the greater the coupling, and vice-versa. The conductors 56 and 58 are thus spaced apart a suitable distance so that the capacitive coupling is such that the required low order capacitively initiated discharge occurs between the sharpened portions 46 of the electrodes 42, across the upper surface 50 of the insulator 48, when the system is pulsed, thereby conditioning the gas in the gap 52 so that a distributed switching glow discharge occurs between the rounded portions 44.

Figure 4:
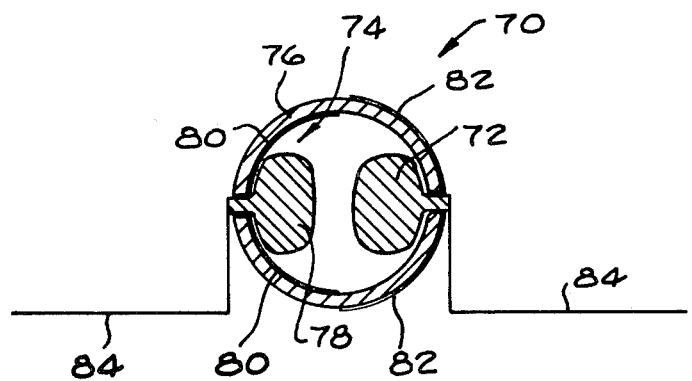
FIG. 4 shows a transverse sectional view of a still further embodiment of a laser in accordance with the invention.

With the laser embodiment 70 shown in FIG. 4, there are two electrodes 72 and 74 located within a tubular glass housing 76. The electrode 72 is unitary, being rounded, whereas the electrode 74 is composite having a rounded portion 78 and two sharpened, foil trigger portions 80 which abut the inner surface of the housing 76 and extend about halfway. A further auxiliary foil conductor 82 is provided which is electrically in contact with the electrode 72 and extends also about halfway around the housing 76 along its outer surface. The electrodes 72 and 74 are excited via supply conductors 84.

It will be appreciated that the foil portion 80 of the electrode 74 is capacitively coupled to the auxiliary conductor 82 and to the electrode 72. Thus, when an excitation pulse is applied via the supply conductors 84, an initial capacitively initiated trigger discharge occurs between the foil portions 80 and the electrode 72, across the inner surface of the housing 76, which conditions the gas so that a distributed lasing glow discharge occurs between the electrode 72 and the rounded portion 78 of the electrode 74.

Figure 5:
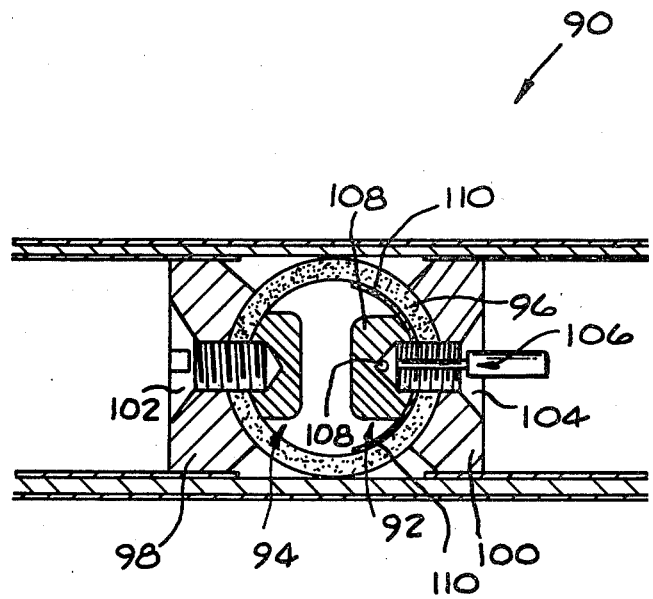
FIG. 5 shows a transverse sectional view of a still further embodiment of a laser in accordance with the invention.

Referring now to FIG. 5, a further embodiment of a laser 90 is shown. This laser 90 is symmetrically triggered and has two electrodes 92 and 94 located within a tubular ceramic housing 96. The electrodes 92 and 94 are secured to aluminium mounting members 98 and 100 by screws 102 and 104 respectively. The screw 104 has a bore 106 which communicates with a passage 108 in the electrode 92. A suitable gas such as nitrogen or carbon-dioxide is introduced into the housing 96 via this bore 106 and passage 108. As shown, and in a similar manner to electrode 74 of FIG. 4, the electrode 92 is composite having a rounded portion 108 and two sharpened, foil trigger portions 110 which abut the inner surface of the housing 76 and extend about halfway around the housing 96.

The mounting members 98 and 100 are mounted between double transmission line-type Blumlein pulsers, each similar to that shown in FIG. 3.

As the operation of this laser 90 is similar to that of the lasers shown in FIGS. 1 and 2 and 4, it will not be considered further.

It will be appreciated by those skilled in the art, that the lasers shown in FIGS. 1, 2, 4 and 5 could equally well be utilised as switches, and the switch shown in FIG. 3 could equally well be used as a laser, with suitable modifications.

We claim:

1. An apparatus for generating a transversely excited high pressure glow discharge in a gas, including;
   two spaced-apart main discharge electrodes which define between them a main discharge gap;
   a means for immersing the main discharge electrodes in a pressurized gas;
   a discharge inducing member that is of an insulating material and which provides a trigger discharge surface adjacent the electrodes and bridging the main discharge gap; and
   an auxiliary conductor located on the other side of the discharge inducing member to the main discharge electrodes which is significantly capacitively coupled with at least a first one of the main discharge electrodes for initiating a self-triggered low order trigger discharge across at least a portion of the trigger discharge surface when an excitation pulse is applied across the main discharge electrodes to photoionize the gas in the main discharge gap and cause a glow discharge between the main electrodes.

2. An apparatus as claimed in claim 1, in which the auxiliary conductor is capacitively coupled to the said first one of the main discharge electrodes by distributed stray capacitance.

3. An apparatus as claimed in claim 1, in which the discharge inducing member has a dielectric coefficient greater than 2.

4. An apparatus as claimed in claim 3, in which the dielectric coefficient is greater than 10.

5. An apparatus as claimed in claim 4, in which the dielectric coefficient is greater than 20.

6. An apparatus as claimed in claim 1, in which the trigger discharge surface bridges the discharge gap completely, extending from one main discharge electrode to the other.

7. An apparatus as claimed in claim 1, in which the auxiliary conductor is sheet-like.

8. An apparatus as claimed in claim 1, in which the auxiliary conductor is directly electrically connected to the second main discharge electrode.

9. An apparatus as claimed in claim 1, in which the main discharge electrodes are rounded to provide a uniform field.

10. An apparatus as claimed in claim 1, in which the said first main discharge electrode has a rounded main discharge portion and a sharpened trigger discharge portion.

11. An apparatus as claimed in claim 6, in which the second main discharge electrode has a rounded main discharge portion and a sharpened trigger discharge portion.

12. An apparatus as claimed in claim 1, in which the means for immersing the main discharge electrodes in a gas comprises a housing.

13. An apparatus as claimed in claim 12, in which a portion of the housing comprises the discharge inducing member.

14. An apparatus as claimed in claim 1 in which the discharge inducing member is of a ceramic material.

15. An apparatus as claimed in claim 12, in which the housing has at least one port through which the gas may be introduced into the housing.

16. An apparatus as claimed in claim 12, in which the housing has an inlet and an outlet port through which the gas may be passed through the housing.

17. An apparatus as claimed in claim 1, in which the gas is at a pressure greater than 10 KPa.

18. An apparatus as claimed in claim 1, which includes a shielding member for electrically shielding the said first main discharge electrode from the auxiliary conductor.

19. An apparatus as claimed in claim 1, which includes a pulse generating means for supplying a voltage pulse across the main discharge electrodes.

20. An apparatus as claimed in claim 19, in which the auxiliary conductor is a conductor of the pulse generating means.

21. An apparatus as claimed in claim 19, in which the pulse generating means is of the Blumlein-transmission type.

22. An apparatus as claimed in claim 1, in which said auxiliary conductor is capacitively coupled to both of said main discharge electrodes.

23. In a laser, an apparatus for generating a transversely excited high pressure glow discharge in a laser gas, including; two spaced-apart main discharge electrodes which define between them a main discharge gap;
  a means for immersing the main discharge electrodes in a pressurized gas;
  a discharge inducing member that is of an insulating material and which provides a trigger discharge surface adjacent the electrodes and bridging the main discharge gap; and
  an auxiliary conductor located on the other side of the discharge inducing member to the main discharge electrodes which is significantly capacitively coupled with at least a first one of the main discharge electrodes for initiating a selftriggered low order trigger discharge across at least a portion of the trigger discharge surface when an excitation pulse is applied across the main discharge electrodes to photoionize the gas in the main discharge gap and cause a glow discharge between the main electrodes.

24. A method of generating a transversely excited high pressure glow discharge in a gas between two spaced-apart main discharge electrodes which define between them a main discharge gap, said method comprising:
  bridging the main discharge gap with a discharge inducing member of an insulating material having on one side thereof a trigger discharge surface adjacent to said electrodes;
  locating an auxiliary conductor on the other side of the discharge inducing member to the main discharge electrodes to be significantly capacitively coupled with at least a first one of the main discharge electrodes for initiating a self-triggered low order trigger discharge across at least a portion of the trigger discharge surface when an excitation pulse is applied across the main discharge electrodes to photoionize the gas in the main discharge gap and cause a glow discharge between the main electrodes; and
  applying an excitation pulse across said electrodes to initially generate a low order self-triggered capacitively initiated trigger discharge across at least a portion of the trigger discharge surface which photoionizes the gas in the discharge gap and produces a glow discharge between said electrodes.

25. A method as claimed in claim 24, in which the trigger discharge surface bridges the discharge gap completely and extends from one main discharge electrode to the other.

26. A method as claimed in claim 24, in which the trigger discharge tracks across the trigger discharge surface.

27. A method as claimed in claim 24, in which the trigger discharge has a greater dynamic impedance than that of the main glow discharge.

28. A method as claimed in claim 24, in which the trigger discharge is initiated due to stray capacitance.

29. A method as claimed in claim 24, in which the trigger discharge occurs between a portion of a first one of the main discharge electrodes and the trigger discharge surface.

30. A method as claimed in claim 26, in which the trigger discharge tracks across the trigger discharge surface onto a portion of a second one of the main discharge electrodes.

31. A method as claimed in claim 29, in which the trigger discharge occurs from a sharpened portion of the said first main discharge electrode.

32. A method as claimed in claim 30, in which the trigger discharge terminates on a sharpened portion of the said second main discharge electrode.

33. A method as claimed in claim 24, in which the main discharge occurs between rounded portions of the main discharge electrodes.

34. A method as claimed in claim 24, in which the main glow discharge causes the gas to lase.

35. A method as claimed in claim 24, in which the gas is passed between the main discharge electrodes.

36. A method as claimed in claim 24, in which the gas is at a pressure of at least 10 KPa.

37. A method as claimed in claim 29, in which the trigger discharge is initiated by capacitive coupling between the said first main discharge electrode and an auxiliary conductor.

38. A method as claimed in claim 37, in which the capacitive coupling between said first main discharge electrode and the auxiliary conductor is varied to be a suitable value by means of a shielding member.

* * * * *